INVENTORS
Heinz Thiele
Konrad Franke
Dietrich Becher by Singer Stern & Carlberg
ATTORNEYS

# United States Patent Office 3,667,836
Patented June 6, 1972

3,667,836
MOTION PICTURE CAMERA WITH MEANS
PRODUCING A DISSOLVING EFFECT
Heinz Thiele, Leinfelden, near Stuttgart, and Konrad
Franke and Dietrich Becker, Stuttgart-Mohringen, Germany, assignors to Zeiss Ikon Aktiengesellschaft, Stuttgart, Germany
Filed Apr. 16, 1970, Ser. No. 29,202
Claims priority, application Germany, Apr. 22, 1969,
P 19 20 438.7
Int. Cl. G03b 19/18
U.S. Cl. 352—91     3 Claims

ABSTRACT OF THE DISCLOSURE

A motion picture camera with a motor operated diaphragm and suitable for producing a dissolving or fading effect at the end of a scene photographed. Separate motors are provided for the film moving gripper and the film wind-up spindle, which latter is equipped with a non-reversing lock. During the dissolving procedure the film gripper moves the film forwardly a predetermined length while the wind-up spindle is stopped, so that this length of film forms a loop in the film space around the wind-up spindle whereupon the film gripper moves the film rearwardly back upon the delivery spool. During the same period of time the film is moved in this manner, the diaphragm is varied from the actual exposure aperture to its smallest aperture and then is opened again to its exposure aperture.

---

Figure 1:
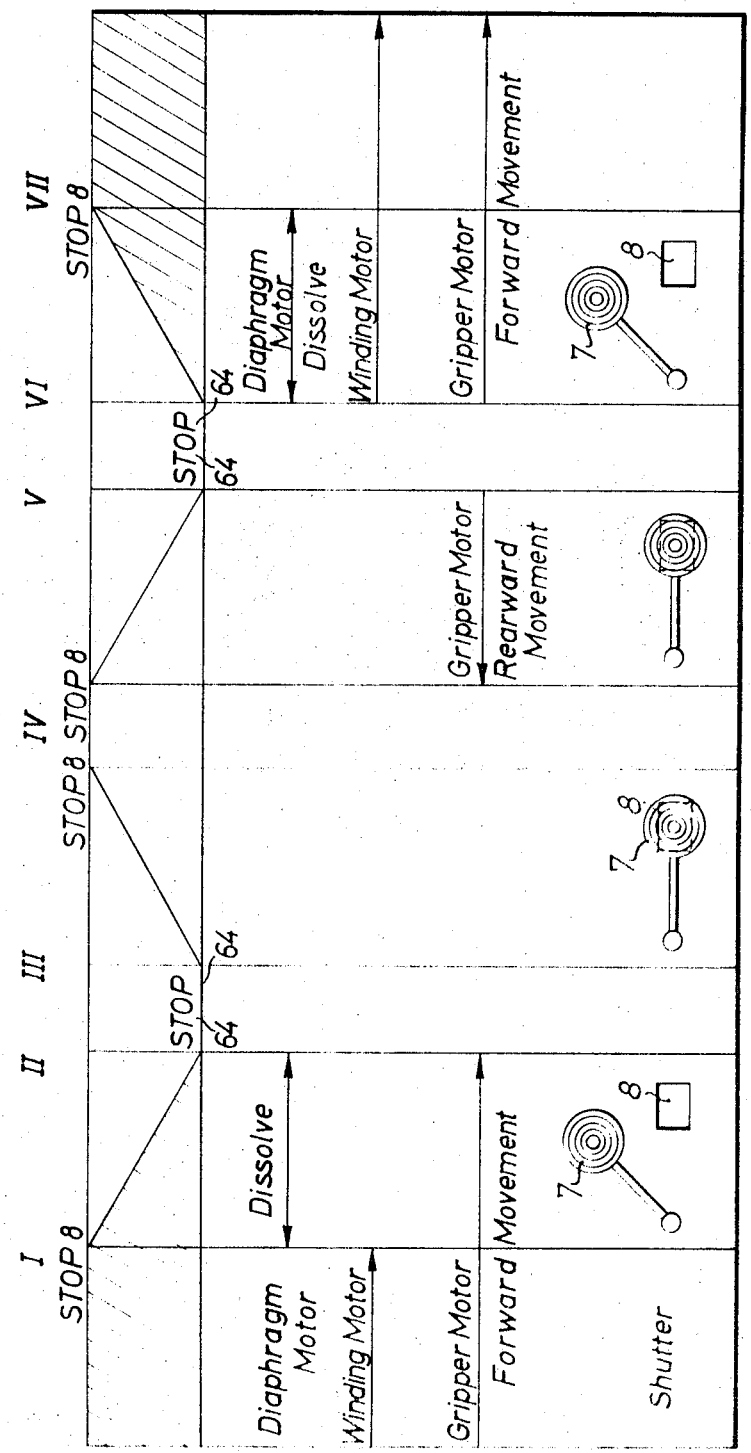

The invention relates to improvements in a motion picture camera. It is customary when producing a dissolving or fading effect during the operation of a motion picture camera, gradually to close the shutter disc when a predetermined number of picture frames is moved through the camera. Thereupon, the same number of picture frames is moved rearwardly by the drive mechanism of the camera and this operation takes place when the shutter disc is closed. Thereafter, the film is again moved in the initial exposure producing direction while the shutter is gradually opened again.

In this manner, the end of a scene is dissolved and mixed with the start of the following scene whereby for this dissolving and mixing procedure that section of the length of the film is available which is moved during the time period between the actually open exposure aperture of the diaphragm and the complete closing of the same.

During this rearward movement of the film, the film section subjected to the dissolving procedure is withdrawn from the wind-up spindle and is re-wound upon the delivery spool. This requires, however, that the film wind-up spindle is capable of rotating forwardly and rearwardly and that during the time period of the rearward movement, the delivery spool and the wind-up spindle are connected with each other by a reversible drive mechanism, so that the film may be moved forwardly and also rearwardly. This procedure is, however, not possible in motion picture cameras in which the film wind-up spindle is provided with a non-reversing lock, as is for instance the case in Kodak Super 8 film magazines.

In connection with such a camera, the dissolving and mixing effect is produced by stopping temporarily the rotation of the wind-up spindle during the forward movement of the film. The film gripper advances the film a predetermined number of picture frames and moves the respective length of film into the free space of the film chamber which surrounds the core. For the purpose of moving the film rearwardly, the direction of the film gripper is reversed and thereby the previously withdrawn length of film—which in the film chamber forms a loose loop—is again wound upon the delivery spool. With such a camera, it is possible when it is again caused to move the film in a forward direction, to photograph the start of a scene by gradually increasing the aperture of the diaphragm.

In the known camera just described a single motor is employed for driving the wind-up spindle and for operating the film gripper. Since now the rotation of the wind-up spindle may be stopped during the dissolving procedure, while the film gripper is in operation, it is necessary to arrange between the motor and the wind-up spindle a friction clutch or some other type of releasable clutch.

For stopping the rotation of the wind-up spindle, a mechanical locking member is provided which cooperates with a cam and is operatively connected with a friction clutch driving said spindle by means of the camera motor.

Another solution for stopping the rotation of the wind-up spindle, is to arrange in the drive between the spindle and the camera motor a manually releasable clutch.

In order to insure that the same number of picture frames, which was advanced by the gripper, is returned by the latter after it has changed its direction of operation, it is known to provide the known camera with a special time storage unit.

It is an object of the invention to eliminate the mentioned clutch or the mechanical lock member which in the known camera is necessary for temporarily stopping the rotation of the wind-up spindle. In fact, also the mentioned time storage unit is eliminated.

In accordance with the invention, a motion picture camera is equipped with a diaphragm-operating motor for opening and closing the diaphragm, and this camera is also so constructed that for the drive of the wind-up spindle and for the drive of the film gripper a separate motor is provided for each. This eliminates, first of all, the clutch which was arranged between the camera motor and the wind-up spindle and, furthermore, this arrangement eleminates also the additional mechanical members, such as a mechanical locking member or a manual releasable clutch, which heretofore were necessary for temporarily stopping the rotation of the wind-up spindle.

The invention resides in this, that the control of the film gripper in forward and rearward direction takes place in dependence on the dissolving procedure which is performed within a predetermined time period by the diaphragm.

According to another object of the invention, the time period required for the operation of the diaphragm motor during the movement of the film in the range between the exposure aperture and the smallest aperture is used as a measure or storage value for the length of film which is to be withdrawn from the delivery spool and is again to be returned thereto.

Still another objec of the invention is that a diaphragm control ring or an indicator controlled by the same during a certain length of its path of movement between the exposure producing diaphragm aperture and the smallest diaphragm aperture serves as a measure or storage value for the length of film which is subjected to the dissolving procedure and is withdrawn from the delivery spool and again is wound upon the same.

As a result of these objects, a special time storage unit is eliminated. According to the invention, the elimination of this unit is due to the time period of movement or to the length of the path which the diaphragm motor or an indicating disk requires to complete the dissolving procedure from the actual size of the exposure aperture down to the smallest diaphragm aperture. In the event that the exposure aperture has already from the beginning on, such a small size that the time period of operation of the motor in order to reach the smallest shutter aperture is much too short, then according to another object of the invention an extension of the path of the diaphragm between its exposure position and the smallest diaphragm aperture is effected by simulating a reduced brightness of the object to be photographed in that means for a corresponding brightness correction are employed, which influences the beam of light which exposes the film.

The invention will now be described in detail with reference to the accompanying drawings, in which—

Figure 2:
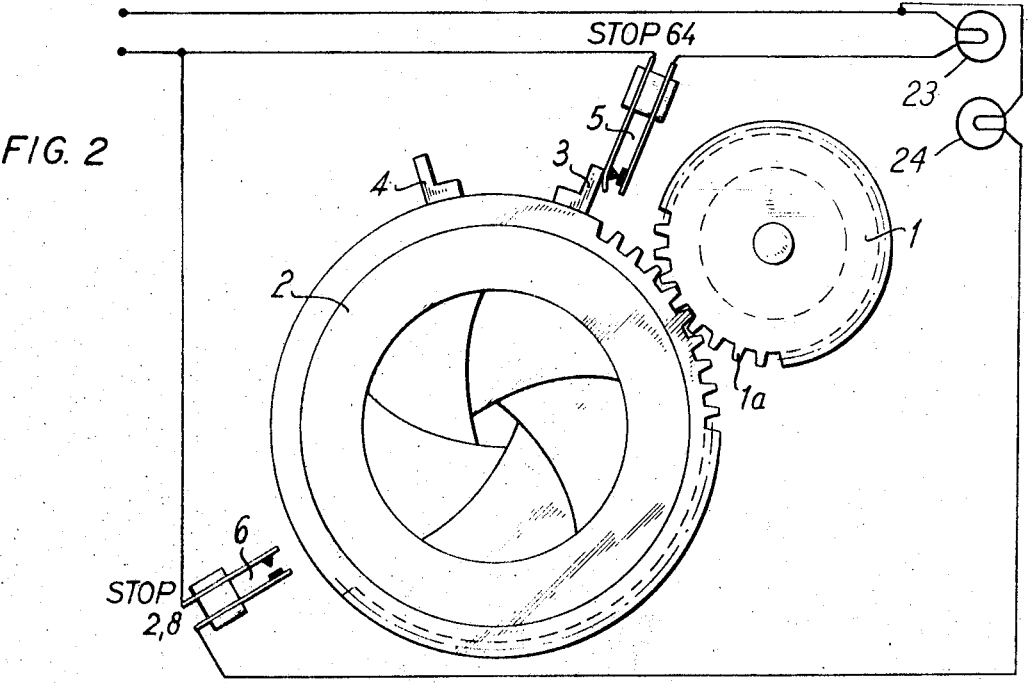
Figure 3:
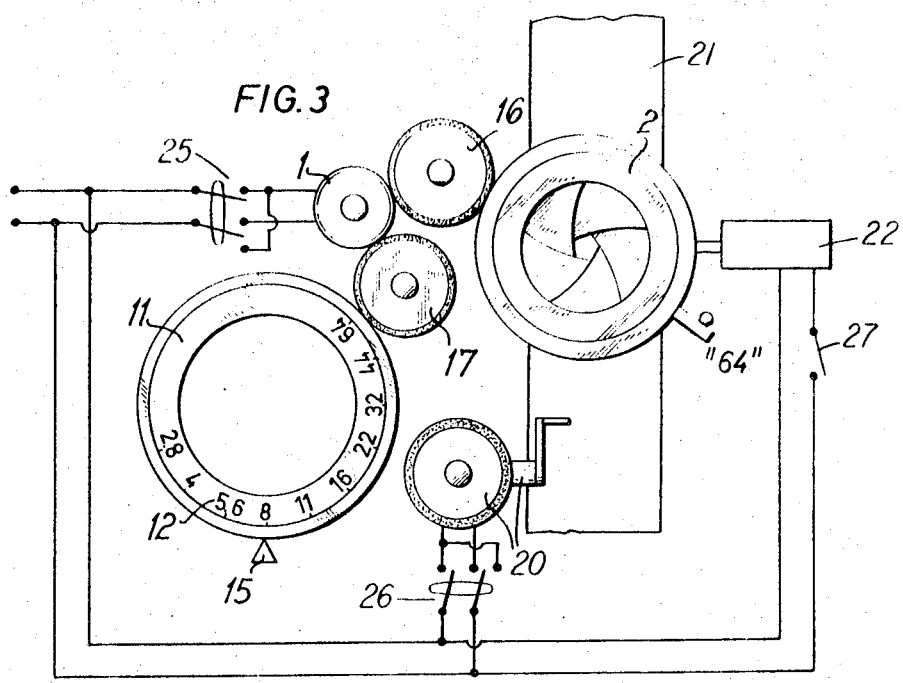

FIG. 1 illustrates diagrammatically a chart explaining the cycles of operation of the dissolving procedure, FIG. 2 illustrates the diaphragm drive and the limit switches cooperating therewith, and FIG. 3 illustrates a time-saving modification.

Referring to FIG. 1, a conventional exposure of the film takes place up to the point of time I. The diaphragm may have the aperture value "8." The winding and gripper motors operate and the shutter is open.

It is assumed that a conventional motion picture camera is used in which the operator of the camera can read the size of the diaphragm aperture. Furthermore, the ends of the diaphragm aperture range are indicated, for instance by lamps of different colors and/or positions. For this purpose, FIG. 2 illustrates a diaphragm motor 1 which drives a gear 1a meshing with a toothed diaphragm control ring 2, which latter is provided with radially projecting end stops 3 and 4 associated with diaphragm apertures "64" and "2.8" respectively, whereby these stops 3 and 4 control the operation of limit switches 5 and 6 respectively in a circuitry which also includes indicator lights 23 and 24. For the present invention, the limit stop 3 for the smallest diaphragm aperture "64" is of particular importance. At the point of time I, the camera operator depresses the dissolve key and thereby the dissolving operation is initiated. The motor driving the wind-up spindle is disconnected. The motor operating the gripper continues to operate in a direction in which the film is advanced and is moved from the delivery spool and is stored in the free space of the magazine because the winding motor is disconnected.

The shutter is open as is indicated by the position of the shutter disc 7 and the picture window 8. The diaphragm moves from its actual exposure aperture, such as "8," toward the position "64." At the point of time II, the dissolving or fading procedure is terminated. The gripper motor is disconnected and a relay closes the shutter.

As soon as the camera operator notices by observing the diaphragm indicator or the lighting of the lamp at the end-position that the diaphragm has been moved to the smallest aperture and that the fading procedure is terminated, he depresses at the point of time III the release member, so that the diaphragm is again opened while the exposure automatic is disconnected and the shutter is closed. As soon as this has taken place at the point of time IV, a contact is actuated and while the shutter is closed, the diaphragm motor is reversed to close again the diaphragm, and the gripper motor is connected so as to move the film rearwardly. The number of the picture frames to be moved rearwardly is self-established by the time period required for the diaphragm motor to run along the diaphragm range from "8" to "64." This means that automatically the same number of picture frames is moved rearwardly as was moved forwardly during the closing of the diaphragm between I and II.

The prerequisite for this operation is that the starting diaphragm value—in the present case the value "8"—at least during the first phase of the dissolving or fading procedure, namely, the diaphragm closing and rearward movement, may be maintained stationary. How this can be accomplished will be described below in connection with FIG. 3.

At the point of time V, the diaphragm is again closed and the withdrawn film section has again been wound on the delivery spool. At the point of time V, the first phase of the dissolving or fading procedure is completed. This first phase comprises the gradual step-down of the diaphragm aperture while an end of a scene is photographed, the storing of the length of the film containing this end of the scene extending over the length of time the diaphragm aperture is changed, and the return movement of the length of the film having said end of the scene recorded on it. At the point of time V, the gripper motor is disconnected and has stopped. The shutter is closed.

If the new scene is to be faded in, at the point of time VI, then the second phase of the dissolving or fading procedure is performed. The diaphragm aperture is gradually enlarged while the new scene is photographed, so that the start of this new scene is mixed or is superimposed on the end of the first scene. For this purpose, the camera operator needs only to depress the camera release member, which causes the gripper motor and wind-up motor to rotate in a forward direction, the shutter opens and the diaphragm aperture "64" increases gradually to its actual exposure value "8," whereupon from the point of time VII on, a conventional photographing of the scene takes place. It may happen that the starting diaphragm aperture in view of the intense brightness of the subject to be photographed is already so small that the storage time, which depends upon the length of time the diaphragm motor has to run, is too short. In such an event, the invention suggests that the exposure diaphragm aperture is opened further, preferably by simulating a lesser brightness of the subject to be photographed, so that the longer time period from the resulting larger diaphragm aperture to the smallest diaphragm aperture may be used for the dissolving or fading procedure. This is accomplished by means which produce a corresponding correction of the beam of light which reaches and exposes the film.

In actual practice this may be accomplished in cameras of different types in the following manner: In each case described in the following, it is assumed the shutter speed of the camera remains unchanged.

In motion picture cameras without an exposure meter and in which the diaphragm adjustment is selected by consulting a manual or separate exposure meter, the camera operator who desires to produce a dissolving or fading or mixing effect, will adjust the diaphragm of the camera to a larger diameter than the one indicated by the exposure measurement. The camera operator may proceed in the following manner: He mounts a filter in front of the photocell of the manual exposure meter, so that in view of the filter, the photocell will be energized with a reduced brightness. The exposure meter will indicate a larger diaphragm diameter than is required, and this diaphragm aperture value is transferred to the camera by adjusting the diaphagm of the latter accordingly. In order to avoid an over-exposure of the film at the beginning of the dissolving or fading procedure, it is necessary to insert in front or into the light beam coming from the subject to be photographed a suitably selected light-weakening member—preferably the same type of a filter as was arranged in front of the photocell of the exposure meter. In view of the foregoing, the camera operator has now established for the dissolving or fading procedure a lesser brightness than is available in practice.

In motion picture cameras with semi-automatically operated exposure meters in which the measurement takes place within the camera casing, it is suggested that a filter which weakens the beam of light is arranged in front of the photocell and also in the path of the beam of light which exposes the film in the camera.

In motion picture cameras with a completely automatic exposure determination and interior measurement of the light, it is necessary to arrange a light-weakening member of the required density in front or in rear of the camera objective.

FIG. 3 illustrates diagramamtically one embodiment of the invention which makes possible a time-saving during the performance of the first phase of the dissolving or fading procedure in which the operations III, and IV. are eliminated. In FIG. 3, the diaphragm motor 1 drives the diaphragm control ring 2 and an indicator disk 11, since these parts are operatively connected with each other by slip clutches or other releasable clutches 16 and 17. The indicator disk 11 carries a diaphragm aperture scale 12 which is adjustable relatively to a stationary index 15 on the camera casing, so that the adjusted diaphragm aperture will appear and can be read opposite the index 15. The operation of this arrangement is as follows:

In the point of time I, the indicator disk 11 is so arrested that the actual diaphragm value "8" is opposite the index 15. The diaphragm motor 1 rotates also by means of the clutch 16 the diaphragm adjusting ring 2 until the smallest diaphragm aperture "64" is reached, but the disk 11 remains stationary and the index 15 is opposite the indication "8."

The result is that the camera diaphragm has been adjusted to the aperture "64," while in the indicator disk 11, which remains stationary and points to "8," a value has been stored which is used for the rearward movement of the advanced length of the film.

The rearward movement of the film is effected by rotating the disk 11 by the motor 1 and the clutch 17. The disk 11 rotates until the stationary index 15 points to "64." The disk 11 also rotates at the same time the gripper motor 20 in the direction necessary for the rearward movement of the film either in a mechanical or electrical manner.

At the end of the rotation of the disk 11, the gripper motor 20 is disconnected and stops. Since now the camera diaphragm—ever since the point of time at II—is at "64" and remains that way, it is now possible to perform with the camera the second phase of the dissolving or fading procedure without employing the time period between III, and IV. The circuitry for accomplishing this is also shown in FIG. 3, where a take-up reel motor 22 for the magazine 21 is controlled by a switch 27, while the diaphragm motor 1 and a motor 20 for the film transport means are controlled by switches 25 and 26, respectively. For the gradually fading exposure of the first scene, the take-up motor 22 is stopped by opening the switch 27, and the transport motor 20 as well as the diaphragm motor 1 is rotated in such a direction that the film section to be subjected to superimposition of the second (different) scene is reeled off from the supply reel, subjected to the fading effect and stored in the form of a loop in the storage chamber in the camera.

At the same time the motor 1 over the clutch disc 17 rotates the indicator ring 11 until the diaphragm value "64" is opposite an index 15 on the camera. By means of a control projection (not shown) on the disc 11 the motor 26 is thereby reversed through shifting of the switch 20, so that it reverses the movement of the stored film section with the shutter closed. The motor 20 is then stopped by opening of the switch 26.

For superimposition of the second scene, motors 22 and 20 are then again changed to forwardly rotation by the respective switches 27 and 26, and the diaphragm motor 1 is switched to gradual increase of the diaphragm aperture from "64" to "8." During this last-mentioned operational phase, the position of the indicator disc 11 is inconsequential. It serves only the purpose of maintaining the selected maximum aperture indication during the fading movement of the film section. During normal filming operation it may advantageously be left at the 2.8 indication in order to avoid any influence on the transport motor 20.

The indicator disk 11 may also be provided with the diaphragm end contacts which according to FIG. 2 were attached to the diaphragm control ring 2.

What we claim is:

1. In a motion picture camera of the type having a non-reversible take-up reel and means for stopping said take-up reel independently of the supply reel, a diaphragm adjustable between a selected maximum and a minimum exposure aperture, a reversible diaphragm drive motor, a first friction clutch means between said motor and said diaphragm, a film gripper means for releasably gripping the film, a reversible gripper motor, a second friction clutch means between said gripper motor and said film gripper means, and a drive motor for said take-up reel, said diaphragm motor, film gripper motor and take-up reel motor being interconnected by an electric circuitry in such a manner that upon stopping of the take-up motor the film gripper motor and through the intermediary of said first friction clutch means the diaphragm motor are operated to cause said film gripper means to unwind a predetermined length of the film from the supply reel while at the same time the diaphragm is adjusted from said selected maximum to said minimum exposure aperture thereby causing a fading effect on said film section, whereupon said film gripper motor and said diaphragm motor are reversed as said second friction clutch means is engaged and said first clutch means is disengaged thereby causing said predetermined length of film to be re-wound on the supply reel while said diaphragm is maintained at said minimum exposure opening, thus enabling superimposition of a second scene upon said film section by restarting said take-up reel motor and again reversing the diaphragm motor to gradually adjust the exposure aperture to said selected maximum.

2. A motion picture camera according to claim 1, including a diaphragm value indicating disc, a friction clutch connecting said diaphragm-adjusting motor with said disc, an arresting means provided for said indicating disc for holding the same in the adjusted position which indicates the selected exposure aperture of said diaphragm while the diaphragm itself is adjusted by its motor to the smallest possible aperture, the return movement of said indicator disc after releasing said arresting means to a position indicating the smallest possible aperture value being used for the rearward movement of the length of the film which was advanced during the dissolving procedure, said rearward movement being effected by said gripper.

3. A motion picture camera according to claim 1, including means for simulating a brightness reduction when the brightness of the object to be photographed requires an exposure diaphragm aperture which is too small for the desired length of the dissolving procedure between said exposure aperture and the smallest diaphragm aperture, said means comprising a light-weakening member arranged in the beam of light which reaches and exposes the film in the camera.

References Cited

UNITED STATES PATENTS

| | | | |
|---|---|---|---|
| 3,549,249 | 12/1970 | Katsuyama | 352—91 |
| 3,494,691 | 2/1970 | Katsuyama | 352—91 |
| 3,514,197 | 5/1970 | Sho | 352—91 |
| 3,461,786 | 8/1967 | Sato et al. | 352—141 X |

S. CLEMENT SWISHER, Primary Examiner